Patented Aug. 27, 1940

2,212,509

UNITED STATES PATENT OFFICE 2,212,509

METHOD OF ESTERIFYING PHENOLIC HYDROXYLS

Oscar A. Cherry, Chicago, Ill., assignor to The Glidden Company, Cleveland, Ohio, a corporation of Ohio No Drawing. Application April 2, 1935, Serial No. 14,377

4 Claims. (Cl. 260—479)

This invention relates to the esterification of phenolic hydroxyls with relatively low-boiling, reactive anhydrides, and has particular reference to a new method for the economical production of these esters. In particular, it contemplates the reaction of phenolic bodies with a mol of anhydride for each mol of hydroxyl to be esterified, and the distillation of acid from the reaction mix as formed.

By low-boiling carboxylic acids it is intended to include those carboxylic acids which boil below 200° centigrade at atmospheric pressure, such as acetic, propionic and chloroacetic acids.

It is well known that phenyl esters of such low-boiling acids may be readily prepared by reacting on a phenol with the chlorides of these acids. The chlorides, however, are expensive to prepare and their use involves the elimination of hydrochloric acid which is difficult to handle in ordinary commercial equipment. The purification of the ester from traces of hydrochloric acid is also expensive.

It is also well known to prepare phenyl esters by reacting on a phenol with a low-boiling organic acid anhydride in the presence of aqueous caustic alkali. This is also expensive in that it involves the use of a molecular proportion of caustic alkali for each molecular proportion of acid anhydride. Furthermore, the ester requires purification from the alkali salt of the acid and from the water. The alkali salt may be recovered by drying, etc. but it has little value.

The same methods are known for the esterification of phenol aldehyde resins but the problems of purification of the resulting resin ester are even more difficult.

It is also known to prepare phenyl and phenolic resin esters by refluxing the phenol or phenol resin with the acid anhydride. In this case the esterification is not complete unless a very large excess of anhydride is employed. If a smaller amount is used the resulting ester needs to be purified by the removal of unesterified phenol. In the case of phenol resins it is almost an impossibility to free unesterified phenol resin from the esterified portion.

Now I have found that if the heat treatment of a phenol or phenol aldehyde resin be carried out under such conditions as will permit the escape of the free acid as formed by the interaction of phenol and anhydride, the reaction may be carried to substantial completion easily and economically. The process may be carried out without the use of an excess of the anhydride and permits the recovery of the acid in a readily marketable form, without further expense.

The process may be readily carried out in a vessel equipped with a fractionating column of such length and such character as will permit the passage of the acid and which will cause the unchanged anhydride to be condensed and returned to the reaction vessel. The construction of such apparatus is well understood in the arts, and the design of the apparatus does not constitute a part of this invention.

Examples will be given to illustrate the practice of the invention. They should be considered in a purely illustrative sense.

Example 1

A mixture of 94 parts of phenol and 110 parts of 92% acetic anhydride is heated so as to distill only acetic acid from the mixture. The reaction is complete when substantially 65 parts of acetic acid have been distilled. For most purposes the ester requires no further purification. If the presence of traces of acetic acid are objectionable they may be removed by washing or by distillation under reduced pressure. If a highly purified product is desired the ester as formed may be distilled.

Example 2

A phenol resin is prepared by reacting on 94 parts of phenol with 70 parts of 40% formaldehyde in the presence of ½ part of oxalic acid. After dehydration it is heated with 110 parts of 92% acetic anhydride in such a manner as to eliminate free acetic acid. The reaction is complete when substantially all of the acetic acid to be derived from the hydration of the acetic anhydride has been distilled. This will require raising the temperature of the contents of the reaction vessel to approximately 280° centigrade.

The ester so formed is sufficiently pure for most purposes. If further purification is desired the ester may be washed or subjected to reduced pressure while being heated gently.

It will be noted in the above example that the acid anhydride is present in sufficient amount to substantially completely esterify all of the phenolic hydroxyl groups in the resin. If for any reason it is desired to esterify only a portion of the hydroxyl groups the amount of acid anhydride may be proportionately reduced.

While I have disclosed but a few examples of the possible reactions, it is obvious that phenyl hydroxyl groups generally may be esterified in this manner, with any of the low-boiling organic acid anhydrides. Thus I have used the various cresols and naphthols as the phenols, as well as phenol aldehyde resins made from this type of phenol; and as acids I have used propionic and chloroacetic.

In the claims, the term "low-boiling acid" refers to those carboxylic acids which boil below 200° centigrade, and which form anhydrides. The term "phenolic body" refers to a compound having free phenyl hydroxyl groups.

I claim:

1. The process of esterifying phenolic hydroxyl groups comprising reacting a phenolic body with a low-boiling acid anhydride, distilling low-boiling acid from the mixture as formed throughout the course of the reaction, while maintaining the phenolic body and anhydride in the reaction zone, the anhydride being in equimolecular proportions to the hydroxyl groups to be esterified, and continuing the reaction until half the acid present in the anhydride has been distilled off.

2. The process of esterifying phenolic hydroxyl groups comprising reacting a phenolic body with acetic acid anhydride, distilling acetic acid from the reaction mixture as formed throughout the course of the reaction, while maintaining the phenolic body and anhydride in the reaction zone, the anhydride being in equimolecular proportions to the hydroxyl groups to be esterified, and continuing the reaction until half the acid present in the anhydride has been distilled off.

3. The process of making phenyl acetate which comprises heating together equimolecular proportions of phenol and acetic anhydride, distilling acetic acid from the mixture as formed throughout the course of the reaction, while maintaining the residual phenol and acetic anhydride, and the phenyl acetate formed, in the reaction zone; and continuing the reaction until half the acid present in the anhydride is distilled off.

4. The process of esterifying phenol aldehyde resins comprising reacting the resin with a low-boiling acid anhydride, distilling low-boiling acid from the mixture as formed throughout the course of the reaction, the anhydride being in equimolecular proportions to the hydroxyl groups to be esterified while maintaining the phenolic body and anhydride in the reaction zone, and continuing the reaction until half the acid present in the anhydride has been distilled off.

OSCAR A. CHERRY.